United States Patent [19]
Williams et al.

[11] Patent Number: 5,696,795
[45] Date of Patent: Dec. 9, 1997

[54] OFFSET QUADRATURE PHASE SHIFT KEYED MODULATION CIRCUIT

[75] Inventors: Bruce Howard Williams, Sandy; Roy Edgar Greeff; Glenn Arthur Arbanas, both of Salt Lake City, all of Utah

[73] Assignee: Unisys Corporation, Blue Bell, Pa.

[21] Appl. No.: 503,954

[22] Filed: Jul. 19, 1995

[51] Int. Cl.⁶ .................................................. H04L 27/20
[52] U.S. Cl. ....................... 375/308; 375/302; 332/103
[58] Field of Search ..................................... 375/308, 302, 375/303; 332/103

[56] References Cited

U.S. PATENT DOCUMENTS

| | | | |
|---|---|---|---|
| 3,987,374 | 10/1976 | Jones, Jr. ................................. | 332/9 R |
| 4,580,277 | 4/1986 | Angello et al. ........................... | 375/67 |
| 4,652,838 | 3/1987 | Nossen ..................................... | 380/6 |
| 4,843,351 | 6/1989 | Edwards et al. ......................... | 332/17 |
| 4,962,510 | 10/1990 | McDavid et al. ........................ | 375/67 |
| 5,253,271 | 10/1993 | Montgomery ............................ | 375/59 |
| 5,534,827 | 7/1996 | Yamaji .................................... | 332/103 |
| 5,534,828 | 7/1996 | Okada et al. ............................ | 332/103 |

*Primary Examiner*—Stephen Chin
*Assistant Examiner*—Mohammad Ghayour
*Attorney, Agent, or Firm*—John B. Sowell, Att.; Mark T. Starr, Att.; John F. O'Rourke, Att.

[57] ABSTRACT

An improved quadrature phase shift key modulator circuit of the type which includes a non-linear amplifier in the transmitter and includes a frequency select logic circuit for receiving the in phase and quadrature phase digital data to be modulated onto a carrier frequency signal. The output of the frequency select circuit produces select signals that are coupled to the input of a digital carrier frequency generator. The digital carrier frequency generator synthesizes and increases, decreases, or leaves unchanged the carrier frequency as a representation of the data occurring on the in phase and quadrature phase input lines. The output of the digital carrier frequency generator is smoothed and converted to an analog signal which has a constant vector power magnitude during phase change. The constant vector power when amplified in a non-linear amplifier of the transmitter is not susceptible to regeneration of side lobes of the carrier signal, thus, provides a more narrow bandwidth modulated carrier frequency signal.

15 Claims, 5 Drawing Sheets

OFFSET QUADRATURE PHASE SHIFT KEYED MODULATION CIRCUIT

BACKGROUND OF THE INVENTION

1. Field of the Invention

The present invention relates to Phase Shift Key (PSK) modulation circuits. More particularly, the present invention relates to a novel improved Offset Quadrature Phase Shift Key (O-QPSK) modulation circuit which has a constant power envelope during phase shifts.

2. Description of the prior Art

It is generally known that digital data, such as non-return to zero (NRZ) data, can be modulated onto a cosine carrier wave and transmitted to a receiver employing a designated and allotted message bandwidth. It is not generally known that international telecommunications satellite specifications include a satellite spectral mask specification which defines the allowed or allotted side lobe power relative to the main lobe power. When the power spectrum of the main and side lobes literally does not fit the allotted spectral mask specifications, then one of three approaches have generally been employed to shrink the power spectrum to fit within the spectral mask specification.

Lowering the data rate reduces the power spectrum. Filtering the data being modulated onto the carrier to shape the data can also reduce the power spectrum but requires a more complex mixer to prevent regeneration of the side lobe power at the output of the power amplifier. When all else fails, the modulated carrier signal can be filtered after side lobe regeneration occurs in the power amplifier to reduce the side lobe power sufficiently to fit the allotted spectral mask specifications.

It would be desirable to provide a novel offset QPSK modulation circuit which substantially reduces the regeneration of side lobe power without reducing the data rate and/or without having to filter the shape of the input data and/or having to filter the output of the linear power amplifier to reduce the side lobe power.

SUMMARY OF THE INVENTION

It is a principal object of the present invention to provide a novel offset QPSK modulation circuit having lower side lobe power than conventional modulation circuits.

It is a principal object of the present invention to provide a novel offset QPSK modulation circuit having a narrow bandwidth of spectral power.

It is a principal object of the present invention to provide a novel QPSK modulation circuit having a constant power magnitude signal vector during phase changes.

It is a principal object of the present invention to provide a novel QPSK modulation circuit comprising a frequency select logic circuit for controlling a numerically controlled oscillator which switches frequency at constant power.

It is a general object of the present invention to provide a QPSK modulation circuit that produces less side lobe power regeneration at the output of the non-linear amplifier than conventional modulation circuits.

According to these and other objects of the present invention, a novel multiple channel shift key modulator is provided with a novel frequency select logic circuit connected to a source of real and quadrature digital data. The frequency select circuit is coupled to a circuit for generating one of three digital carrier frequencies indicative of data to be modulated onto the carrier. The frequency of the modulated carrier signal is changed over a portion of one-half of one symbol time at constant power creating a constant power envelope. The stairstep digital carrier signal which is produced in a digital to analog convertor is smoothed before being amplified in an analog linear power amplifier and regenerates less side lobe power than with conventional modulation circuits.

DESCRIPTION OF THE PREFERRED EMBODIMENTS

It is generally known that prefiltered conventional QPSK signals having in phase and quadrature phase data signals suffers substantial side lobe regeneration when amplified in a non-linear amplifier of the transmitter. It is generally known that offset QPSK data signals incurs less side lobe generation and overcomes this problem. The present invention is an improvement of an offset QPSK modulator and further suppresses side lobe regeneration than modulation circuits employing nonlinear amplifiers used in both conventional QPSK and offset QPSK of the prior art type.

Figure 1:
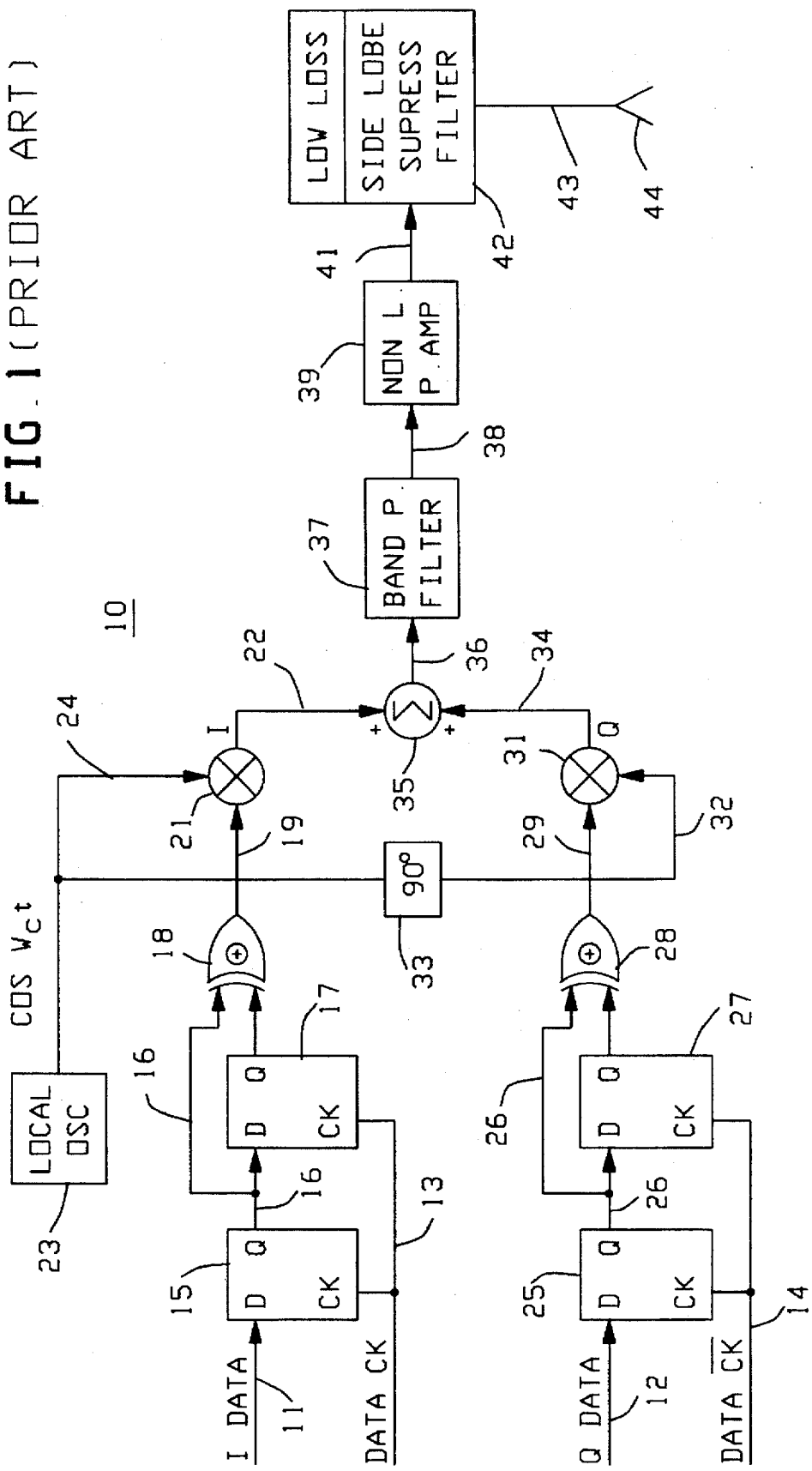
FIG. 1 is a schematic block diagram of a prior art offset quadrature phase shift keyed modulator circuit.

Refer now to FIG. 1 showing a schematic block diagram of a prior art O-QPSK modulator circuit 10. The modulator circuit is shown having an input of binary data which is typically NRZ data comprising the in phase data on line 11 and the quadrature-phase data Q on line 12. The data is clocked by a data clock on line 13 or a not data clock on line 14. The in phase data on line 11 is applied to a flip flop 15 which produces a latched or delayed output on line 16 that is applied to the data input of a second flip-flop 17. The output of flip-flop 17 is shown applied to an exclusive OR circuit 18 along with the nondelayed data signal on line 16. The output of the exclusive OR gate 18 comprises the differentially encoded I channel data on line 19 which is applied to the input of an I channel mixer 21. The output of the I channel mixer 21 on line 22 comprises the I data modulated RF carrier signal. Mixer 21 is also shown having the carrier signal produced by a local oscillator 23. The cosine signal on line 24 is applied to the mixer 21.

In a similar manner the quadrature phase data on line 12 is applied to a flip-flop 25 which produces a delayed data signal on line 26 is applied to a second flip-flop 27 having its delayed output applied to a second exclusive OR circuit 28 shown having a second input from line 26. The output from exclusive OR gate 28 comprises the quadrature differentially encoded data on line 29 which is applied to an input of mixer 31. The mixer 31 is shown having a sine input signal on line 32 produced by phase shifting the cosine signal on line 24 in the phase shifter 33. The output on line 34 is supplied to a RF summing circuit 35 which produces the summed RF carrier signal on line 36. The sum signal on line 36 is applied to a band pass filter 37 to produce a filtered output signal on line 38 which preferably has as much of the side lobe power reduced as is possible. The signal on line 38 is applied to a conventional non-linear power amplifier 39 which produces an amplified signal on line 41 having regenerated side lobe power. The regenerated signal on line 41 is now applied to a low loss side lobe suppression filter 42 which is preferably a band pass filter that again reduces the side lobe power on the output line 43 to the antenna 44. In summary, it will be noted that when the band pass filter 37 is employed it causes the modulator circuit 10 to be susceptible to the regeneration of side lobe power in the power amplifier. Thus, it is generally known that for O-QPSK and conventional QPSK that the non-linear power amplifier 39 negates any filtering effect which is formed prior to amplification.

Figure 2:
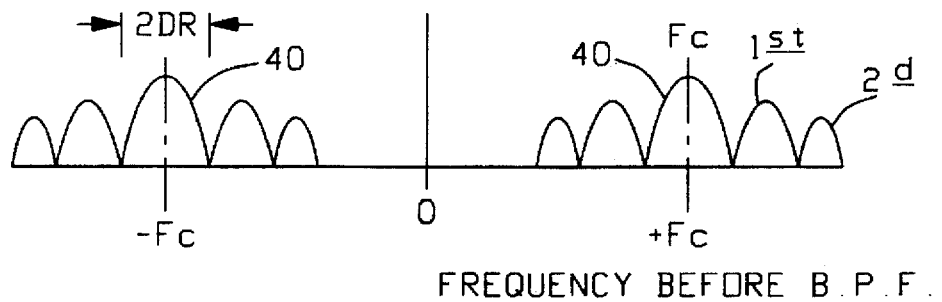
FIG. 2 is a schematic drawing of the carrier frequency showing lobes or side bands generated by the modulation circuit of FIG. 1.

Refer now to FIG. 2 showing a diagram of the carrier frequency with side bands generated by the modulation circuit of FIG. 1. The typical frequency spectrum diagram is occurring at line 36 of FIG. 1 before the band pass filter and comprises a center lobe carrier frequency having a bandwidth twice the symbol or data rate (2DR). The main lobe 40 contains all or most of the data information and the side lobes which continue are typically attenuated and form an extraneous bandwidth that is not required or needed.

Figure 3:
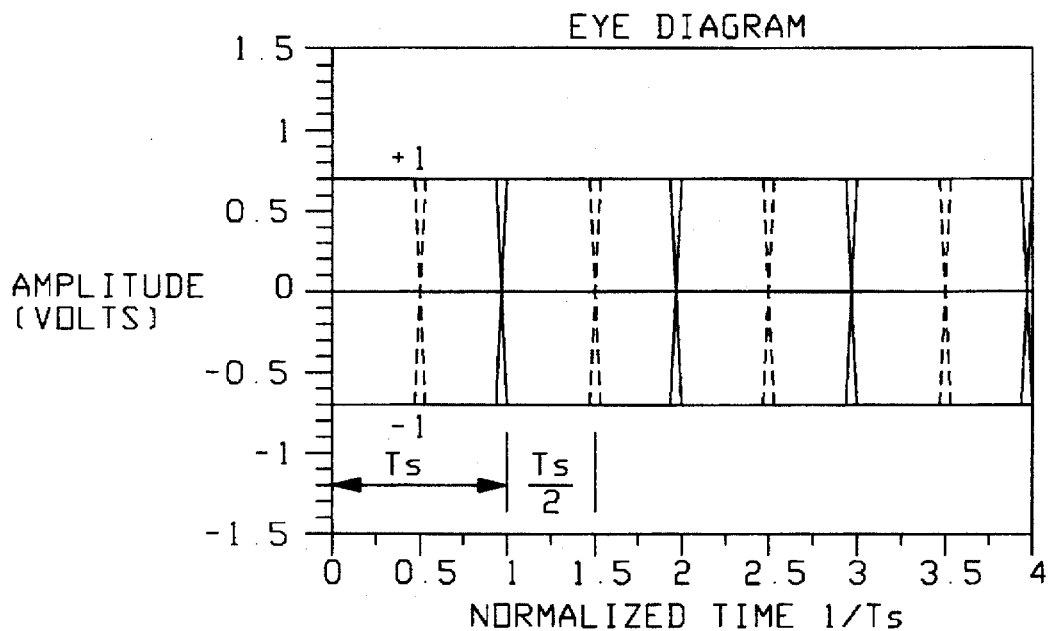
FIG. 3 is waveform eye diagram of the in phase and quadrature phase differentially encoded data showing a symbol time period.

Refer now to FIG. 3 showing a waveform eye diagram of the in phase and quadrature phase differentially encoded data. The solid vector lines are representative of the in phase data and the dotted lines are representative of the quadrature data which is offset in time by a half of a symbol time $T_{S/2}$. This is a typical offset QPSK eye diagram which has been normalized in time versus amplitude in voltage.

Figure 4:
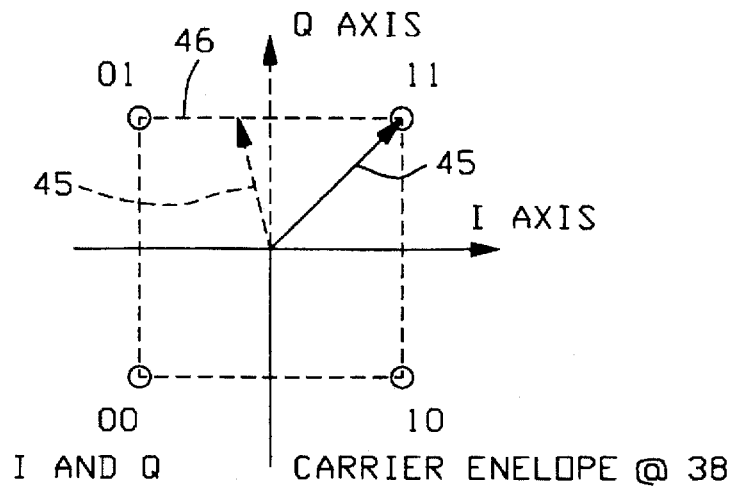
FIG. 4 is a frequency vector diagram of the carrier signal envelope produced by the modulator of FIG. 1.

Refer now to FIG. 4 showing a phase or space vector diagram of the carrier signal envelope which is produced by the modulator 10 of FIG. 1. FIG. 4 represents an eye and Q signal vector for the four different eye and Q data combinations on lines 11 and 12. The data can produce four separate vector signals having four separate or unique phases which are shown in FIG. 4. The unfiltered vector on line 36 changes phases substantially instantaneous when changed by the data in FIG. 3. However, when filtered, the data does not change instantaneously but is delayed by the filter 37. For example, when the vector 45 is moving from the 45 degree I and Q signal vector position 0.11 to the 135 degree I and Q signal vector position at 0.01, the vector moves along the line 46 and is delayed by the filter 37. The magnitude of the signal vector 45' is shown reduced as it moves along line 46.

Figure 5:
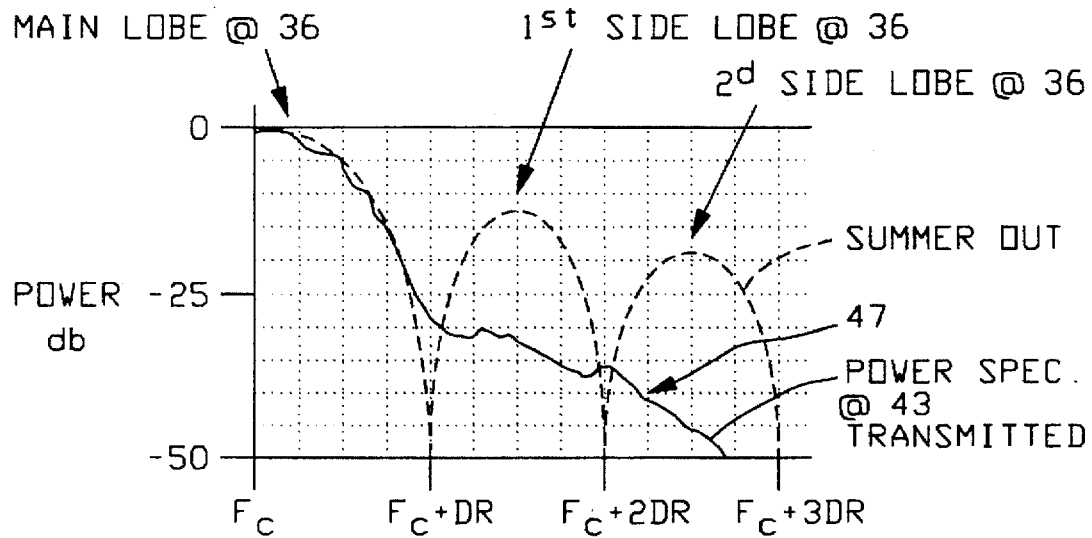
FIG. 5 is an enlarged waveform diagram of the prior art carrier power spectral density with side bands showing side lobe regeneration produced by the FIG. 1 prior art modulator.

Refer now to FIG. 5 showing a waveform of the prior art carrier power spectral density with side bands showing the regeneration produced by the modulator of FIG. 1. The main lobe power is accompanied by a first side lobe and a second side lobe before filtering as shown in phantom lines. However, after filtering, and then amplifying, the side lobe power is reduced at line 41. The reduced power spectrum signal 47 occurs at line 41 and is shown having side lobe power which crosses over into the first and second side lobes of the phantom curve. Thus, it will be noted that in the prior art modulator using offset QPSK prefiltering and then amplifying the signal the power spectrum of the signal still extended its bandwidth into the second side lobe and must be post filtered before being transmitted.

Figure 6:
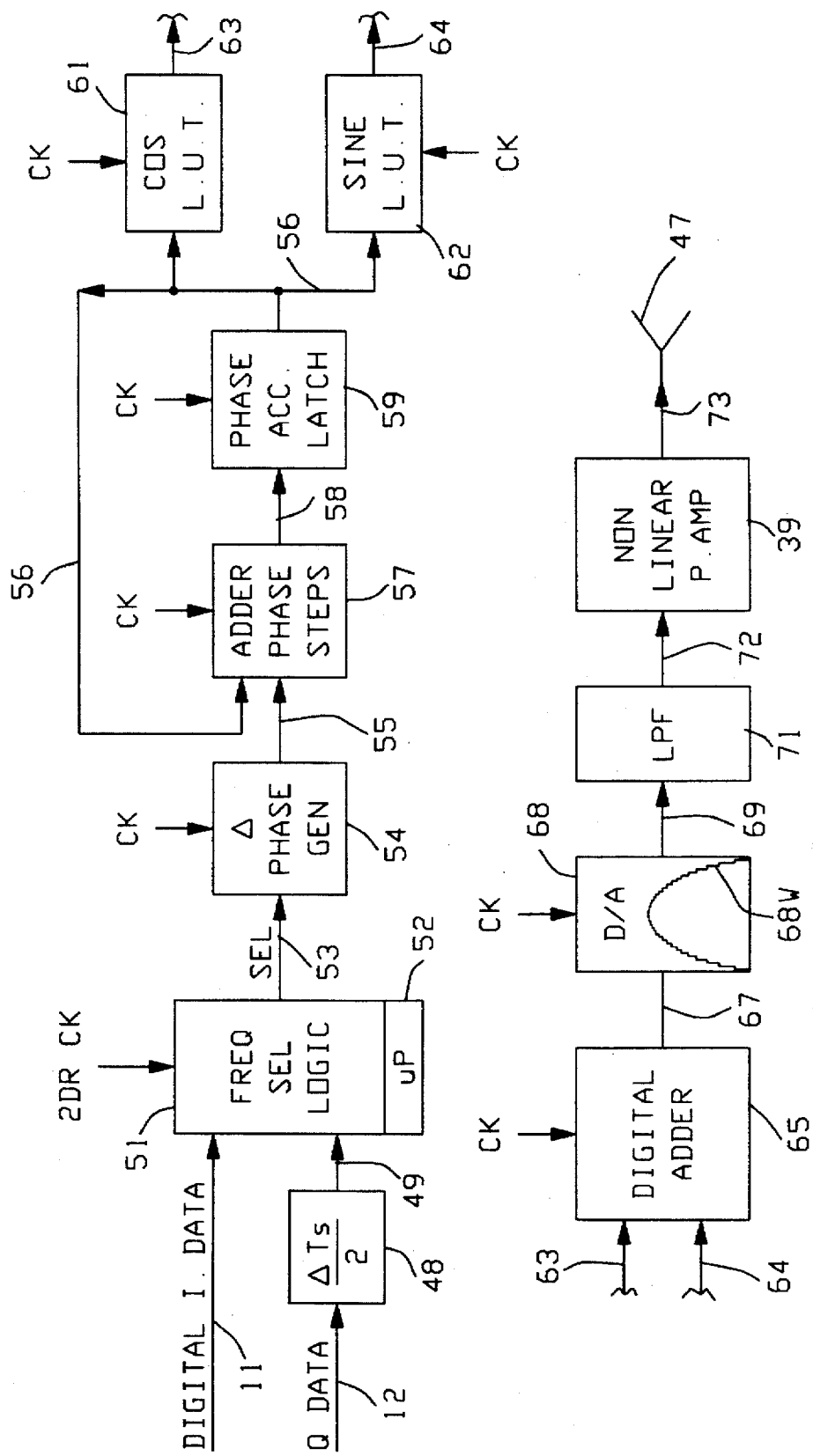
FIG. 6 is a schematic block diagram of the present invention offset quadrature phase shift keyed modulator employing a prior art type non-linear power amplifier for purposes of comparison to the prior art modulator.

Refer now to FIG. 6 showing a schematic block diagram of the present invention offset quadrature phase shift keyed modulator which may also employ a prior art type of non-linear power amplifier. The data on lines 11 and 12 is typically NRZ binary data which is applied to the modulator. The quadrature phase data on line 12 is delayed in delay 48 by one-half or one symbol time to produce the offset data on line 49. The data on lines 49 and 11 is applied to the present invention novel frequency select logic circuit 51 which comprises a microprocessor 52 and logic which will be explained in greater detail hereinafter. The only signal which microprocessor 52 needs to produce is a select signal on line 53 which is applied to a Delta phase generator 54 which produces predetermined increments of phase change as will be explained hereinafter. The output of phase generator 54 on line 55 is applied to an adder 57 as a step. The adder also has an accumulative phase input on line 56 causing the adder 57 to produce an accumulated phase output on line 58 which is applied to the phase accumulator latch 59. The output of the phase accumulator latch on line 56 is applied to cosine look up table 61 and sine look up table 62 respectively to produce output signals on lines 63 and 64 which are applied as inputs to the digital adder 65. Before proceeding with the explanation of the elements which follow digital adder 65 it is well to note that the elements 54 through 65 are typical of the elements which may be found in commercially available direct digital synthesizers (DDS) and such a component may be substituted in place of these elements which sometime include the digital adder 65 and sometimes it must be added as a separate element. The output of the digital adder 65 on line 67 is applied to a digital input to analog converter 68 and produces a staircased analog signal as illustrated at waveform 68W which appears as an output on line 69. The fuzzy or staircased analog signal 68W is smoothed in the low pass filter 71 to produce a smooth analog signal modulated with in phase and quadrature data and comprises a constant envelope vector signal. Since the signal on line 72 is a constant envelope vector signal as will be explained hereinafter the non-linear amplifier 39 does not regenerate side lobes. The clean analog signal on line 73 contains all of the necessary data without the extraneous side lobe power explained hereinbefore with reference to FIG. 4. The antenna 47 can be the identical antenna as explained with reference to FIG. 1, however the bandwidth of the signal being transmitted is more narrow and more concentrated in its frequency domain than the signal on antenna (44) of FIG. 1.

Figure 7:
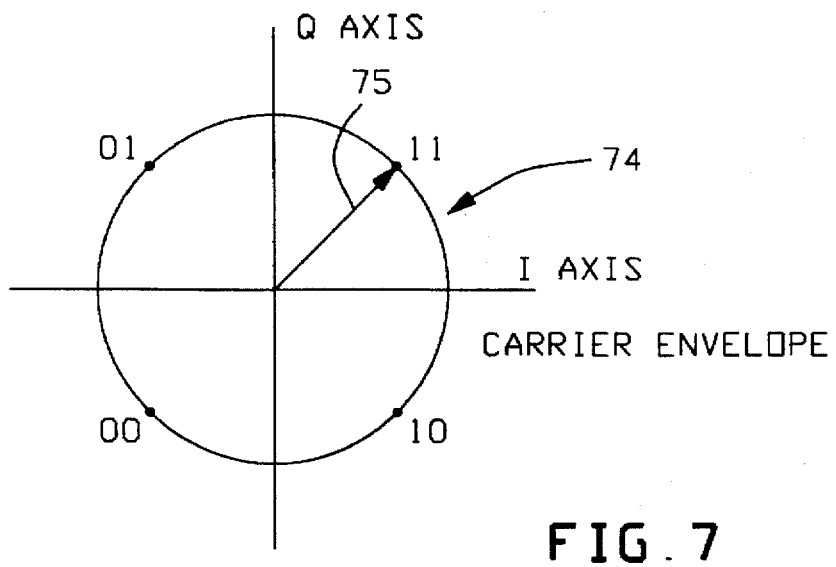
FIG. 7 is a frequency vector diagram of the carrier envelope produced by the modulator of FIG. 6.

Refer now to FIG. 7 showing a phase or space vector diagram of the carrier envelope produced at line 72 or 73 in the present invention modulator circuit of FIG. 6. The carrier envelope 74 of FIG. 7 is a circle which indicates that the vector 75 retains its constant power as it shifts from the four different phases shown in the four quadrants of FIG. 4. Thus, it will be understood that when the vector 75 is changing from its 45° position shown as 0.11 it must move along the circle to either point 0.10 or 0.01 in order to change the phase and frequency of the carrier signal.

Refer now to Table 1 showing an I-transition time logic table of the type which performs the frequency select logic function in block 51 of FIG. 6. When the Q state is zero and its I state is transitioning from zero to 1 the frequency of the carrier is set at F1 which is equal to the carrier frequency $F_C$ plus one-half of the symbol frequency $F_{S/2}$. In similar manner when the Q state is zero and the I state is transitioning from 1 to zero, the frequency is set at F2 which is equal to the carrier frequency ($F_c$) minus half of the symbol frequency ($F_{s/2}$). Finally, when the Q state is zero and the I transition state has no change, the frequency is set at F3 which is equal to the carrier frequency ($F_c$). Thus, it will be understood that there are only three different frequencies which are generated by the select circuit on line 53 and implemented by the direct digital synthesizer or phase generator explained heretofore in detail with reference to FIG. 6. In a similar manner when the Q state is one as shown in Table 1 and the I state transition from zero to 1, or zero, to 1, or no change respectively, the frequency is set frequencies F2, F1 and F3 respectively as shown in Table 1.

TABLE 1

| I-Transition Time Logic | | |
|---|---|---|
| Q State | I-transition | Frequency |
| 0 | 0 → 1 | $F_1 = F_c + F_{s/2}$ |
|   | 1 → 0 | $F_2 = F_c - F_{s/2}$ |
|   | No change | $F_3 = F_c$ |
| 1 | 0 → 1 | $F_2 = F_c - F_{s/c}$ |
|   | 1 → 0 | $F_1 = F_c + F_{s/c}$ |
|   | No change | $F_3 = F_c$ |

Refer also to Table 2 showing an I-transition time logic for the Q state. The explanation for this table is self explanatory having explained the functions which occur in Table 1. Having explained the problems which existed in conventional QPSK modulation circuits and the improvement which was made by a prior art offset QPSK circuit it will now be understood that the best descriptive name for the present invention is an improved offset QPSK modulation circuit. The novel result performed by the present invention improved offset QPSK modulation circuit is accomplished by creating a filtered effect without the harmful effects of a bandpass filter before amplifying the processed signal so as to substantially reduce our eliminate the regeneration side lobe power. Further, it will be recognized that employing the constant envelope modulation technique explained hereinbefore in a conventional QPSK circuit it will be possible to reduce side lobe regeneration power which occurs in such QPSK circuits.

TABLE 2

| Q-Transition Time Logic | | |
|---|---|---|
| I State | Q-transition | Frequency |
| 0 | 0 → 1 | $F_2 = F_c - F_{s/2}$ |
|   | 1 → 0 | $F_1 = F_c + F_{s/2}$ |
|   | No change | $F_3 = F_c$ |
| 1 | 0 → 1 | $F_1 = F_c + F_{s/c}$ |
|   | 1 → 0 | $F_2 = F_c - F_{s/c}$ |
|   | No change | $F_3 = F_c$ |

Figure 8:
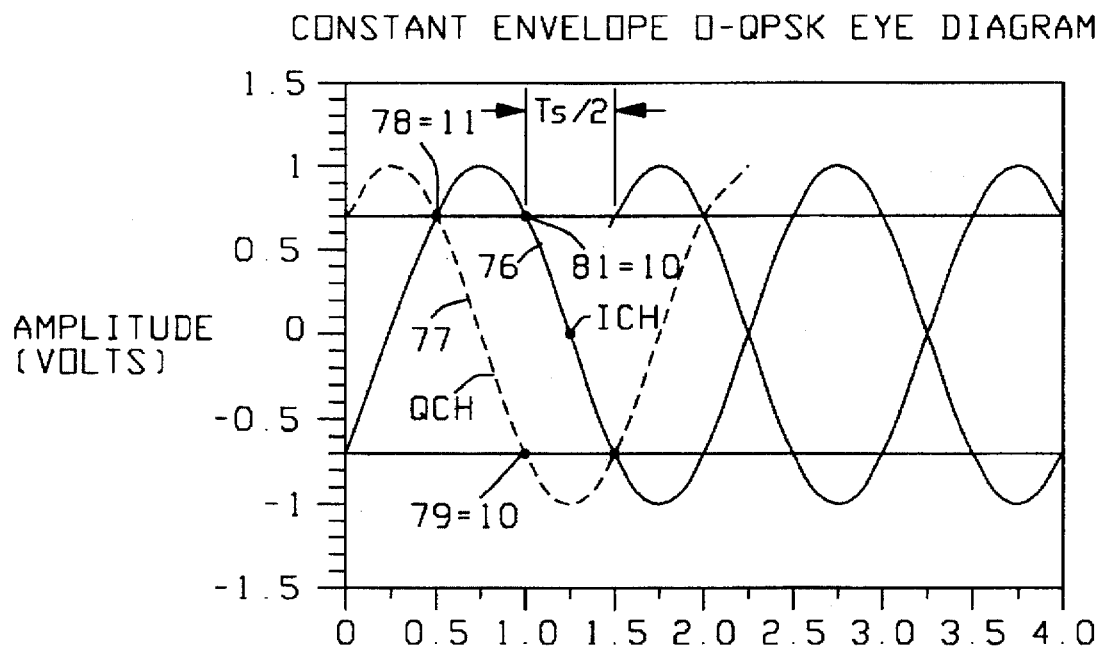
FIG. 8 is a waveform eye diagram of the in phase and quadrature phase differentially encoded data showing the modified pulse shape produced by the FIG. 6 modulator.

Refer now to FIG. 8 showing a waveform eye diagram of the in phase and quadrature phase differentially encoded data produced by the modulator shown in FIG. 6. In this regards the two waveforms 76 and 77 are representative of the I channel and Q channel signals which are actually being produced at the output of look up tables 61 and 62. However, since the waveforms are continuous they actually represent the components of the waveform being produced on line 69. When the Q channel waveform 77 is at point 78 it crosses over the identical point 78 produced by I channel waveform 76. Thus, this diagram is representative of the vector 75 as explained with reference FIG. 7. The Q channel and I channel signals are shown at the same identical point 78 (45° and 0.11). After the Q channel and I channel signals have moved one-half of one symbol time ($T_{s/2}$), the I channel crosses point 81 the same time the Q channel crosses point 79 (the Q data is now at zero as shown in FIG. 7). When the vectors at point 81 and 79 are added together, it will be seen that the vector magnitude 75 in FIG. 7 has maintained its constant amplitude during this transition time. Thus, the carrier envelope represents a constant power and is not diminished by switching frequency.

Figure 9:
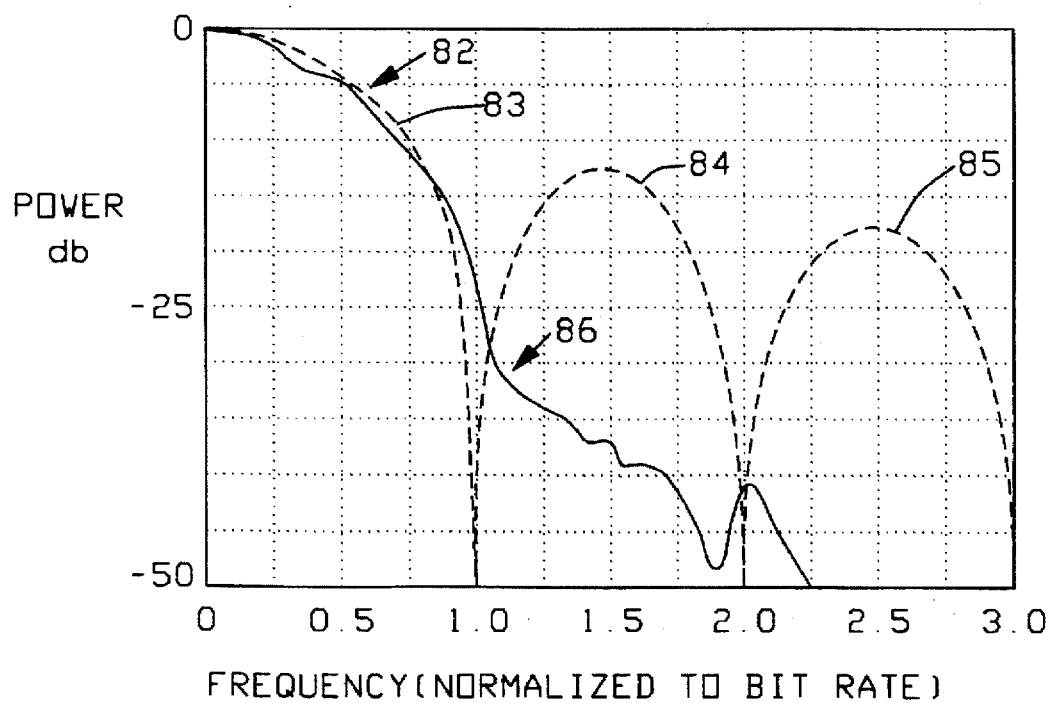
FIG. 9 is an enlarged waveform diagram of the novel carrier frequency showing the present invention suppressed side band carrier signals produced by the novel modulator shown in FIG. 6.

Refer now to FIG. 9 showing an improved carrier frequency power spectral density waveform superimposed on a phantom-line carrier frequency which has not been filtered or processed. The unprocessed carrier spectral density waveform 82 comprises three components which are the main lobe 83, first side lobe 84, and the second side lobe 85 as explained hereinbefore. However, the processed offset QPSK signal, produced on line 73 of FIG. 6 and shown as waveform 86, has substantially no extraneous signal component in the second side lobe 85 and the extraneous signal produced in the first side lobe 84 is reduced by 5 decibels or down two-thirds of its total power. Thus, it will be appreciated that the modulation circuit shown in FIG. 6 substantially eliminates all of the side lobe power outside of the first side lobe and reduces the power in the first side lobe to an extraneous signal which does not affect the data and the bandwidth of the main power. Further, the extraneous power under the first side lobe is reduced to a point where it easily fits within the spectral mask specification for allotted bandwidth with enhanced power and/or data rates.

What is claimed is:

1. A digital quadrature shift key modulation circuit, comprising:

frequency select circuit means having an in phase data input and a quadrature phase data input and an output for initiating a change in carrier phase indicative of the data presented at the data inputs of the frequency select circuit means, digital carrier generator means coupled to the output of said frequency select circuit means for generating digital carrier signals that are phase modulated by the input data at its output, a digital to analog converter coupled to the output of said digital carrier generator means for generating as an output a phase modulated analog replica signal of said digital carrier signals, filter means coupled to the analog replica signal for smoothing said analog replica signal, and analog power amplifier means coupled to said filter means for amplifying the smooth phase modulated analog replica signal with a minimum of regenerated side lobe power.

2. A digital modulator circuit as set forth in claim 1 wherein said frequency select circuit means comprises a logic circuit having a microprocessor device and a plurality of memory registers.

3. A digital modulator circuit as set forth in claim 2 wherein said frequency select circuit means comprises means for sensing the previous data state.

4. A digital modulator circuit as set forth in claim 3 wherein said frequency select circuit means further comprises means for sensing the present data state and if a change in the data state has occurred and for generating a frequency select signal.

5. A digital modulator circuit as set forth in claim 1 wherein said digital carrier generator comprises a Delta phase generator for generating incremental phase changes over a predetermined portion of a data symbol time.

6. A digital modulator circuit as set forth in claim 5 wherein said digital carrier generator further includes a phase accumulator latch for storing total accumulated phase changes and for generating addresses indicative of desired vector phase changes.

7. A digital modulator circuit as set forth in claim 6 wherein said digital carrier generator further includes a cosine look up table for generating digital cosine values.

8. A digital modulator circuit as set forth in claim 7 wherein said digital to analog convertor is coupled to the output of said cosine look up table for generating a staircase carrier frequency signal.

9. A digital modulator circuit as set forth in claim 7 wherein said digital carrier generator further includes a sine look up table and an adder for combining digital cosine and sine values into a digital carrier signal.

10. A digital modulator circuit as set forth in claim 5 wherein said digital to analog converter produces as an output a carrier signal of constant power during incremental phase changes.

11. A digital modulator circuit as set forth in claim 5 wherein said Delta phase generator is programmable to affect predetermined incremental phase changes over a portion of a data symbol time during which time the carrier frequency ($F_c$) changes.

12. A digital modulator circuit as set forth in claim 1 wherein said in phase and quadrature phase data input signals are offset in time by one-half of one data symbol time.

13. A method of performing phase shift key modulation on digital data while maintaining a constant carrier power vector envelope comprising the steps of;

applying an in phase digital signal to a frequency select circuit, applying an offset quadrature phase data signal to said frequency select circuit, determining from past and present in phase and quadrature phase digital data signals whether to increase or decrease the carrier frequency or leave the carrier frequency unchanged as an indication of the in phase and quadrature phase digital data signals, selecting increments of phase change over a plurality of clock periods to effect the desired carrier phase change, generating digital sine and cosine values indicative of a transitional carrier wave signal, converting the transitional digital carrier wave signal to an analog signal at the desired digital phase, smoothing said digital carrier wave signal by filtering to provide a smooth analog carrier signal at the desired phase, and amplifying said smoothed analog carrier signal during the change at constant power.

14. A method as set forth in claim 13 wherein the step of amplifying smooth analog signals includes the step of suppressing regeneration of side lobe power.

15. The method as forth in claim 13 which further includes the step of changing the magnitude of the selected increments of phase change to effect different carrier frequencies.

* * * * *